(12) United States Patent
Kotzin

(10) Patent No.: US 7,088,220 B2
(45) Date of Patent: Aug. 8, 2006

(54) METHOD AND APPARATUS USING BIOMETRIC SENSORS FOR CONTROLLING ACCESS TO A WIRELESS COMMUNICATION DEVICE

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 409 days.

(21) Appl. No.: 10/600,487

(22) Filed: Jun. 20, 2003

(65) Prior Publication Data

US 2004/0257196 A1    Dec. 23, 2004

(51) Int. Cl.
*G06F 7/14* (2006.01)

(52) U.S. Cl. .................. 340/5.82; 340/5.52; 340/5.74; 455/411; 382/115

(58) Field of Classification Search ............... 340/5.52, 340/5.53, 5.54, 5.8, 5.74, 5.82; 455/411, 455/563; 713/186; 382/115, 116; 704/273
See application file for complete search history.

(56) References Cited

U.S. PATENT DOCUMENTS

| | | | | | |
|---|---|---|---|---|---|
| 4,449,189 | A | * | 5/1984 | Feix et al. ................... | 704/272 |
| 4,993,068 | A | * | 2/1991 | Piosenka et al. ............. | 713/186 |
| 5,229,764 | A | * | 7/1993 | Matchett et al. ............. | 340/5.52 |
| 5,412,738 | A | * | 5/1995 | Brunelli et al. .............. | 382/115 |
| 5,686,765 | A | * | 11/1997 | Washington ................ | 307/10.5 |
| 5,719,950 | A | * | 2/1998 | Osten et al. ................. | 382/115 |
| 5,745,555 | A | | 4/1998 | Mark .......................... | 379/95 |
| 5,768,382 | A | | 6/1998 | Schneier et al. .............. | 380/23 |
| 5,812,067 | A | * | 9/1998 | Bergholz et al. ............ | 340/5.52 |
| 5,907,149 | A | | 5/1999 | Marckini ..................... | 235/487 |
| 6,016,476 | A | * | 1/2000 | Maes et al. .................... | 705/1 |
| 6,091,835 | A | | 7/2000 | Smithies et al. ............. | 382/115 |
| 6,092,192 | A | | 7/2000 | Kanevsky et al. ........... | 713/186 |
| 6,104,922 | A | * | 8/2000 | Baumann ..................... | 455/410 |
| 6,213,391 | B1 | | 4/2001 | Lewis ......................... | 235/380 |
| 6,219,439 | B1 | | 4/2001 | Burger ........................ | 382/115 |
| 6,295,605 | B1 | | 9/2001 | Dockter et al. ............. | 713/166 |
| 6,314,401 | B1 | | 11/2001 | Abbe et al. .................. | 704/273 |
| 6,356,868 | B1 | | 3/2002 | Yuschik et al. ............. | 704/246 |
| 6,463,415 | B1 | | 10/2002 | St. John ...................... | 704/273 |
| 6,498,970 | B1 | * | 12/2002 | Colmenarez et al. ......... | 701/36 |
| 6,788,928 | B1 | * | 9/2004 | Kohinata et al. ............ | 455/411 |
| 6,850,147 | B1 | * | 2/2005 | Prokoski et al. ............ | 340/5.53 |
| 2004/0128519 | A1 | * | 7/2004 | Klinger et al. .............. | 713/186 |

FOREIGN PATENT DOCUMENTS

| | | |
|---|---|---|
| EP | 0991027 A2 | 5/2000 |
| WO | WO 01/16940 | 3/2001 |

* cited by examiner

*Primary Examiner*—Edwin C. Holloway, III
(74) *Attorney, Agent, or Firm*—Charles W. Bethards

(57) ABSTRACT

A wireless communication device (300) and corresponding system therein uses a plurality of biometric sensors (206, 208, 210) for assessing the identity of a user requesting access to a feature or service provided via the wireless communication device (300). A method comprises collecting (410) a biometric sample from one of the sensors and enabling the feature or service (414) when the sample matches a known sample (412) corresponding to the user. Preferably a sensor will be selected, based on evaluating whether a corresponding predetermined condition exists (406), from a list of the plurality of sensors that is prioritized according to accuracy and ease of use of the sensor.

19 Claims, 3 Drawing Sheets

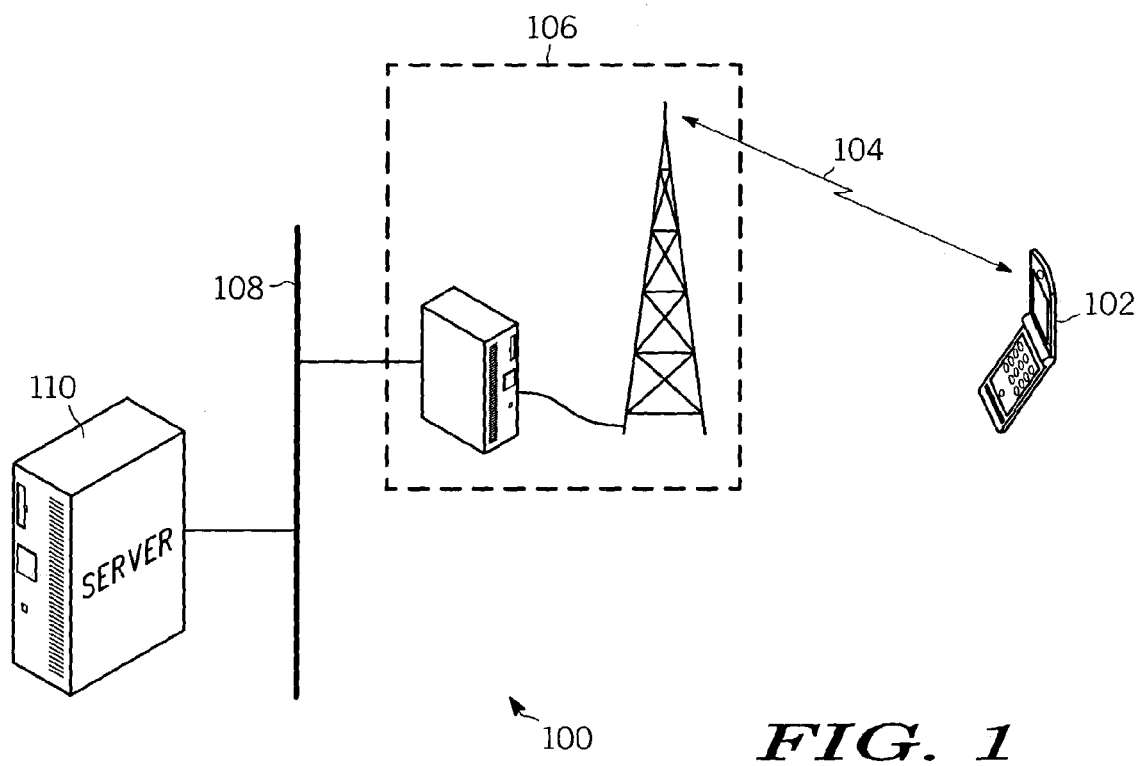
FIG. 1
FIG. 2
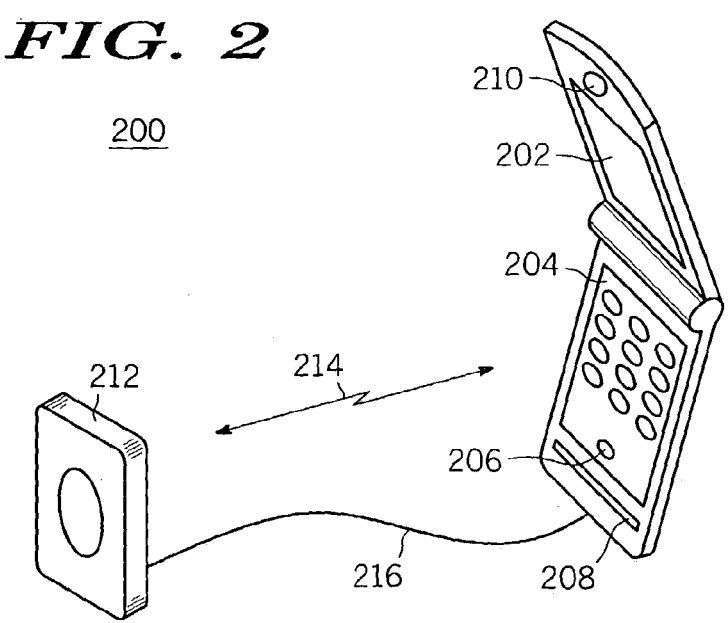

METHOD AND APPARATUS USING BIOMETRIC SENSORS FOR CONTROLLING ACCESS TO A WIRELESS COMMUNICATION DEVICE

FIELD OF THE INVENTION

This invention relates in general to communication systems, and more specifically to a method and apparatus for using biometric sensors for controlling access to a wireless communication device.

BACKGROUND OF THE INVENTION

The use of a biometric device or a biometric sensor, such as voice recognition, as part of a system to control access to a wireless communication device has been contemplated. However, in many cases, the use of a particular biometric sensor may be hindered, inconvenient, or even prevented when needed depending on the circumstances and environmental conditions at the time of use. For example, a fingerprint scanner may not be convenient to use if the weather is cold and a user of the wireless communication device is wearing gloves, or if the wireless communication device requires a facial recognition biometric but there is insufficient light to get a useable photo from an embedded camera. In another case, voice recognition may not work when there is high ambient noise, such as at a rock concert. Clearly a need exists for an improved method and apparatus for using biometric sensors for controlling access to a wireless communication device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

FIG. 1 depicts, in a simplified and representative form, a diagram of a communications system;

FIG. 2 depicts, in a simplified form, a representative wireless communication device having a plurality of biometric sensors;

DETAILED DESCRIPTION OF PREFERRED EMBODIMENT

Figure 3:
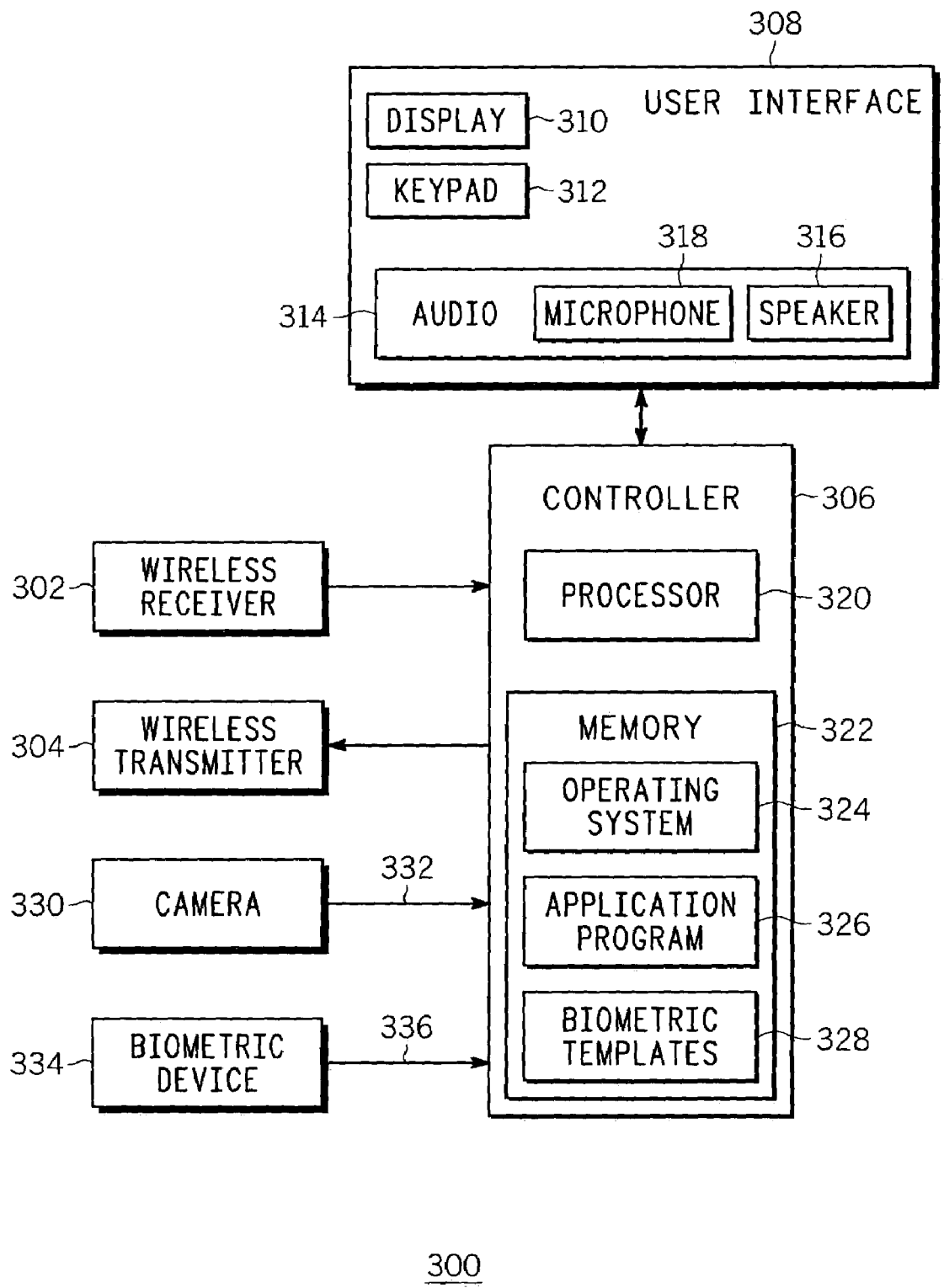
FIG. 3 depicts, in a simplified and representative form, a block diagram of a wireless communication device for using a plurality of biometric devices.

In overview, the present disclosure concerns communications systems and wireless communication devices used in those communications systems for offering a high but convenient level of security when accessing features and functions available through the wireless communication device. These features and functions may exist both on the wireless communication device itself or simply use the wireless communication device as an access point for something available elsewhere in the communications system or beyond. The higher level of security is provided by a mechanism for improving the likelihood in a convenient manner that the user of the wireless communication device is the person authorized to access these features and functions. The mechanism is biometrics, where a user's physical characteristics are measured and then compared to a previously collected measurement. When a sufficient match is determined, access to the particular feature or function is allowed.

More particularly various inventive concepts and principles embodied in methods and apparatus for using more than one such biometric sensor are discussed as well as mechanisms for selecting a particular sensor either automatically or manually. Special cases where non-biometric authentication methods are employed are also discussed.

As further discussed below various inventive principles and combinations thereof are advantageously employed to improve security and the convenience of such security surrounding the use of wireless communication device features and functions, thus alleviating various problems associated with the use of high value services or access to highly sensitive data while still facilitating use in a variety of circumstances where non-ideal conditions may prevail, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Referring to FIG. 1, a block diagram of a simplified and representative communications system 100 is discussed and described. A wireless communication device 102 is capable of supporting one or more of a number of applications for the productivity, convenience and entertainment of the user including a personal organizer, games, messaging and Internet connectivity as well as normal voice traffic. In the instance where an interactive game or Internet access or voice traffic is involved, a signal 104 connects the wireless communication device 102 with a network infrastructure 106. In some cases, for example, retrieving voice mail messages, an interaction may be between the infrastructure 106 itself and the wireless communication device 102.

In other cases, such as network access to corporate information, the communication may extend from the network infrastructure 106 over a network 108, either public or private, to a content or application server 110. Whether the access to information or a service is contained on the wireless communication device 102, extends to the network infrastructure 106, or to a content or application server 110, such information or services may have a significant value. Confidential client contacts or access to a company's proprietary data may require that steps be taken to help ensure that such information is not casually available to anyone having access to the wireless communication device. Many times, the ability to make a call from the wireless communication device 102 may involve security and privacy concerns.

To address the issue of using a wireless communication device for accessing confidential information, a biometric device may be used to limit access to the wireless communication device 102 in general or to a particular application program or service. The purpose of the biometric device is to reduce the opportunity for a non-authorized person to use the wireless communication device 102 in a prohibited manner. The biometric device is used to sample or uses a sample of a feature of a person requesting access to the wireless communication device 102 and compares it to a previously stored sample, preferably taken under the supervision of a certifying authority and securely stored or signed to prevent tampering. When the sample collected by the biometric device matches or matches to a prescribed extent the previously stored biometric sample, a reasonable level of assurance can be achieved that an authorized person is attempting access. Whether the sample taken by the biometric device is processed and compared on the wireless communication device 102, by the network infrastructure 106 or by a content or application server 110 is up to the system architect and depends on the nature of the biometric and the risks involved.

The elements of the communication system 100 are known and available. The wireless communication device 102 can be a typical cellular telephone or handset such as those available from manufacturers, such as Motorola. One such handset, commonly referred to as the model i95, can advantageously utilize the principles and concepts when enhanced as described in the following disclosure. The network infrastructure 106 is common to communications infrastructure systems similar to various cellular systems or Integrated Digital Enhanced Network equipment available from Motorola and utilized in networks operated by various service providers. The content or application server 110 is readily available from suppliers such as Dell or Hewlett Packard and may operate as a server for Internet traffic using software such as Windows from Microsoft Corporation. The network 108 is typically the Internet or an equivalent private packet network, whose makeup of routers from companies such as Cisco and transmission equipment from companies such as Lucent is well known.

Referring to FIG. 2, a representative wireless communication device, such as a cellular handset, PDA wireless interconnect, or the like, having a plurality of biometric sensors is discussed and described. The wireless communication device 200 comprises a display 202 and a keypad 204. It further comprises a plurality of sensors for use in a plurality of biometric devices. The microphone 206 of the user interface may be used to capture speech samples for use in a voice recognition biometric device. A fingerprint scanner bar 208 may be used in fingerprint recognition. An embedded camera 210 may be used in facial recognition or iris recognition biometric devices.

One or more external units may be used for biometrics as well, either as complete devices providing all aspects of biometric assessment or just the sensor when the wireless communication device 200 is used for computing a match. A sensor 212, such as a fingerprint scanner, may be connected either wirelessly over a wireless local area network 214 such as 802.11 (Wi-Fi) or Bluetooth or via a wired connection 216.

In operation, any of the sensors 206, 208, 210 will collect raw data for use in a biometric assessment. The data will be processed into, for example, a compressed form and analyzed. For example, a fingerprint will be analyzed for minutia (relevant fingerprint information) such as breaks, splits and loops in individual fingerprint lines. The minutia are plotted against a known set of minutia and a statistical analysis of the match is made. If the correlation between the user sample and known fingerprint reaches a threshold level, the biometric is considered passed or satisfied and an indication is made by the biometric device to that effect. The actual calculation of minutia and correlation with the known sample may occur in the wireless communication device 200, in an attached biometric device 212, or a networked processor 110. It is ideal to have the calculation done closer to the sensor, since the raw sensor data must be handled securely to maintain the integrity of the check. In any event, known methods of encrypting (public key or conventional) may be utilized to insure an appropriate degree of security and trust.

The biometric sensors are known and available. Fingerprint scanners are available from Saflink of Bellevue, Wash. and Casio Corporation with U.S. offices in Dover, N.J. Cameras suitable for use in wireless communication devices such as Sanyo Electric Company's iGT99263 may be used for hand, iris and face recognition applications. Hand recognition software is available from Identix and Recognition Systems. Face recognition software is available from Cognitec. Iris recognition software is available from Iriscan Corporation. Signature recognition software is available from Cybersign and requires an external signature pad or a touch screen display 310 on the wireless communication device for capturing signature strokes. A less favored option, retina scanning, is available from Access Controls International using a scanner from EyeDentify.

Referring to FIG. 3, a block diagram of a wireless communication device for using a plurality of biometric devices is discussed and described. The wireless communication device 300 is comprised of several major functional components. A wireless receiver 302 for receiving radio frequency (RF) transmissions and a wireless transmitter 304 for sending RF transmissions are coupled to a controller 306. The controller 306 manages the functions of the wireless communication device 300. Coupled to the controller 306 is a user interface 308 for interacting with a user of the wireless communication device 300.

The user interface 308 is comprised of a display 310 which may be used for text or graphics or both. The display 310 may be monochrome, grayscale or color. If enabled for touch sensitivity it may be used to capture user input as well. A keypad 312 is used to capture user input and is often numeric in nature with control keys for managing calls and data entry. The user interface 308 also comprises an audio section 314 for playing sounds through a speaker 318 and capturing sound such as spoken utterances through a microphone 318. Generally the user interface is known with the various elements commercially available.

The controller 306 comprises a processor 320 for executing software instructions stored in a memory 322. The memory may comprise both volatile and non-volatile memory and may be partitioned into functional data blocks for the operating system 324, application programs 326, and user memory for use in storing data such as biometric templates 328. A camera 330, as well as other biometric sensors 206, 208, 210 (not specifically shown) may be coupled to the controller 306 via a peripheral interface 332. An external biometric device 334, such as a self contained fingerprint or retinal eye scanner may be attached via an external bus 336. The controller 306 is able to address and control sensors for use in determining biometric matches.

Many of these same sensors are suitable to determine the conditions related to the wireless communication device's 300 current operating environment. For example, the display 310 may have a temperature sensor for determining if heat is required to keep the display 310 from freezing. A camera 330 can be used to sense ambient light, just as the microphone 318 can be used to sense ambient noise. When trying to access a feature or service via the wireless communication device 300 it may be important to a system architect that a high security environment not depend on a biometric authentication scheme that may not function or be readily accessible in some anticipated conditions. For example, face recognition using a camera 330 as a data capture sensor may not function well or at all in the dark. A voice recognition device using the microphone 318 to capture the voice signal may not function with high ambient noise, such as at the scene of a public safety emergency. In such cases, the wireless communication device should have access to a plurality of biometric sensors or devices to maintain a robust and convenient security environment.

The components of the wireless communication device 300 are known and available. The wireless receiver 302 and wireless transmitter 304 are common in the industry and are available as discrete components or as a chipset from manufacturers such as Motorola. The controller 306 is or may include a microprocessor or digital signal processor (DSP), each also available from Motorola. In some instances the controller 306 may be another single chip processor such as an advanced risk machine (ARM) microcontroller manufactured by Motorola and other semiconductor companies. The processor 320 and memory 322 are in most cases at least in part integral to the controller. Some elements of the memory 322 may be external to the controller 306 and are widely available in the commercial marketplace. The elements of the user interface 308, including the display 310, the keypad 312, audio circuitry 314 including the speaker 316 and the microphone 318 are commodity items and readily available from a variety of manufacturers and distributors. The camera 330 and a number of biometric device 334 options were discussed above with reference to FIG. 2.

In operation, the wireless communication device 300 is arranged and constructed to enable a function, either local or remote, when the identity of a user is confirmed. The wireless communication device 300 comprises and utilizes the controller 306 for enabling the function or providing access when the identity of the user is confirmed using one of the plurality of biometric devices, such as the devices 206, 208, 210 (330, 334). The function may include access to the wireless communication device 300 itself or a feature or application such as a game. Other functions protected by biometric identity verification may include high value content such as corporate financial records or intellectual property, an application such as contact manager, and a service provided by the wireless communication device such as stock market conditions or prices and the like.

The plurality of biometric devices preferably each focus on a different aspect of the user, comprising, for instance, sensors for fingerprint recognition, hand recognition, retinal scan, iris recognition, signature recognition, face recognition, and voice recognition. In some cases, the sensor may already exist in a standard wireless communication device 300 such as the microphone 318 and associated software for voice recognition. In other cases, such as fingerprints, the sensor may be highly specialized.

Since all biometric sensors may not work equally well under all circumstances, but high and reasonably convenient security is still required, a set of rules describing predetermined conditions may be used to support selection of the most accurate sensor available for use in a given circumstance. The controller 306, coupled to the plurality of biometric devices 324, selects one of the plurality of biometric devices when a corresponding predetermined condition is present. The predetermined conditions may include the time of day or the date if the user has a known schedule indicating that some biometrics may not be suitable, for example, signature recognition while driving.

Another predetermined condition or set of predetermined conditions may involve the physical environment of the wireless communication device 300. As mentioned above, some sensors may not provide adequate data in all situations: a camera 330 with low ambient light, a microphone 318 in the presence of high ambient noise, and a skin sensor such as fingerprint scanner 208 in very low temperatures. In one embodiment, a first biometric device will likely have a higher reliability in assessing the identity of the user. This is the preferred device and is selected when the corresponding predetermined condition indicates a suitable operating environment.

The biometric devices may be selected from a list that is arranged hierarchically according to characteristics of the available biometric devices. The list may be ordered by the ease of confirming the identity of the user, that is, the ease of getting a good reliable measurement. For example, while a fingerprint may be more accurate, among some populations, such as elderly Asians, fingerprints can be difficult to obtain using electronic scanners. In other embodiments, the list may be ordered simply by the reliability of confirming the identity of the user or by some combination of reliability and ease of use.

It may be convenient in some applications to allow the user to override the controller selection of one of the plurality of biometric devices and select a second biometric device to confirm the identity of the user. For example, the controller may determine that there is sufficient light for a camera 330 to get a face recognition biometric, but given a rainstorm, the user does not want to expose the wireless communication device 300 to the elements and chooses a voice recognition biometric. However, since a preferred, more reliable, biometric may be skipped or not used, the controller can be operable to limit the number of times a second biometric device may be used to confirm the identity of the user before the first, or preferred, biometric device must be used to confirm the identity of the user. This interval or number of uses of the second sensor before requiring that a preferred biometric be used may also be one aspect of the predetermined conditions.

There can be situations when none of the biometric sensors is available, such as a dark, cold, stormy night or when another person needs access to the wireless communication device 300. In that case, an alternate access method, usually set on or enabled for a given time interval, and perhaps only allowing limited access may be used to enable the requested function. For example, a keypad may be used for entering a password, such as a personal identification number, when none of the plurality of biometric sensors is selected or selectable and the controller is operable to enable the function when the password matches a known password.

In an alternate embodiment, a system 340 for authorizing the use of a feature on a wireless communication device, such as the wireless communication device 300 is provided. The system 340 comprises a plurality of biometric sensors 206, 208, 210 each for collecting a sample corresponding to a user biometric. The system also comprises a controller 306 coupled to the plurality of biometric sensors 206, 208, 210. One of the plurality of biometric sensors is selected when a corresponding predetermined condition is present. This predetermined condition is reflected, for example as ambient environment information, such as temperature, light and noise levels. The controller is programmed to collect a first sample from the selected one of the plurality of biometric sensors 206, 208, 210 and authorizes the use of the feature or services when the first sample corresponds to a known sample.

The feature or services may reside entirely on the wireless communication device 102 or be or be supported or facilitated by an application or service supported in the network infrastructure 106 or another network server or resource 110. The process of matching the sample to the known sample may also occur locally or use or be supported by a service provided by the network infrastructure 106 or another networked resource such as the server 110, as long as a chain of trust is maintained between participants.

The biometric sensors 206, 208, 210 may be any sensor that is capable of collecting a sample related to a user such as a fingerprint, a hand, a retina, an iris, a signature, a face, and a voice or other audible signal. The system can operate in a manner such that a first biometric sensor is selected by the controller 306 according to a corresponding predetermined condition and the user selects a second biometric sensor, that is, the user has the ability to override the controller 306 such that the biometric sample is collected from the second sensor. To prevent abuse of the override capability, the system can enforce an interval or number of over rides whereby the first or preferred biometric sensor must be used to authorize the use of the feature after a predetermined number of consecutive uses of a second or less preferred biometric sensor in order to authorize the use of the feature or such services and features that require security clearance.

Figure 4:
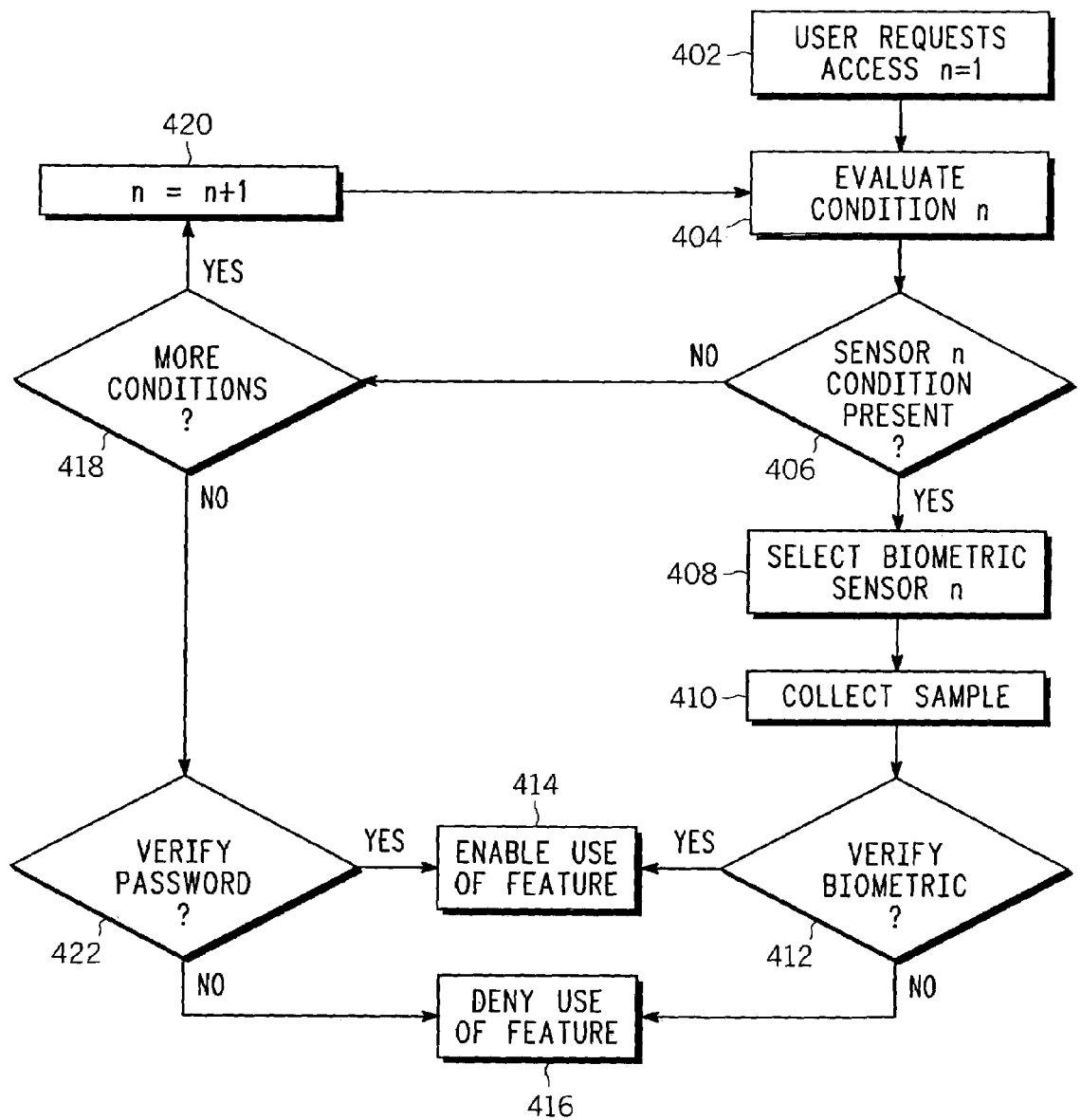
FIG. 4 is a flow chart for using a plurality of biometric sensors to enable access to a feature on a wireless communication device.

Referring to FIG. 4 a flow chart of a method embodiment, using a plurality of biometric sensors, to enable access to a feature or services on a wireless communication device is discussed and described. The process or method begins 402 when a user requests access to a feature on a wireless communication device 300 where the feature or function requires identification of the user prior to allowing use of the feature. For example, the user activates a key or series of keys indicating a desire to access an application or a record or uses voiced utterances and speech recognition to attempt to dial a phone number. A counter is set to 1, where the maximum value of the counter is equal to the number of biometric sensors available. A predetermined condition corresponding to one of a plurality of biometric sensors 206, 208, 210 is evaluated 404. The first predetermined condition as determined or evaluated at 404 normally corresponds to a preferred biometric sensor or device and represents circumstances that results in more accuracy when matching the biometric sample from that sensor to the known sample. The evaluation 404 determines whether a suitable operating environment for the first biometric sensor is present.

If the predetermined condition exists the yes branch from 406 is taken. The biometric sensor corresponding to the predetermined condition is selected 408 and a biometric sample is collected 410 from the user requesting access. For example, the user can be prompted with a message on the display indicating what action is required on the part of the user to collect the proper sample. A process for verifying 412 the biometric is performed. This verification as earlier alluded to can include comparing the sample to a known or expected sample and looking for a threshold to be satisfied. When a match is found, the yes branch of 412 is followed to 414 and the feature is enabled for access or use by the user. If the biometric match fails at 412 the no branch is followed and access to the feature is denied 416.

If at 406, the predetermined condition does not exist, the no branch is followed to 418. If more predetermined conditions have been defined the yes branch from 418 is followed to 420, the counter n is incremented by one and the next predetermined condition is evaluated at 404. Processing continues as described above, that is, if another predetermined condition exists a corresponding sensor is selected for use in verifying the user biometric. This establishes a preferred order for selecting the biometric sensor to be used. The preferred order may correspond to the accuracy of collecting the sample and a corresponding accuracy of the biometric match. The preferred order may correspond to the ease of collecting the sample, for example, taking a photograph of the user's face may be considered easier than shining a laser in the user's eye.

The user may have a personal preference for a particular sensor. The preference may relate to a personal trait, for example, the user has dry skin and good fingerprint scans are difficult to capture. A personal preference may be situational, as mentioned above where, in a rainstorm, a user may not wish to expose the wireless communication device to the rain to take a photograph for use in facial recognition. In these cases, the user may be provided with an option to select a different access mechanism from one that may be selected by the controller using the above process. Since the choice of the user may have lower security, the wireless communication device may limit the number of times one access method may be used before another, perhaps higher security, method must be used to verify the user's identity.

When at 418 no more predetermined conditions are available to check, that is the predetermined condition is not present an alternative is made available. In the case where no default biometric is defined, a biometric sample will not be available for verification of the user and the no branch from 418 is followed. The user is presented an opportunity to enter a password or present a token to prove identity. The password or token indicate the user has knowledge or a physical object that support their claim to their identity and the right to access the feature. The token may be a smart card from a manufacturer such as Gemplus, a magnetic stripe card or radio frequency identity card or tag from HID Corporation or a key. The use of a token may involve an external peripheral 212. When a valid password is entered or a valid token presented, the feature may be enabled following the yes branch from 422 to 414. If the identity of the user is not verified at 422, the no branch is taken to 416 and the use of the feature is denied.

The processes, apparatus, and systems, discussed above, and the inventive principles thereof are intended to and will alleviate problems caused by the use of a single access control mechanism, particularly biometric access control when used in non-ideal conditions. Using these principles of defining a priority for the use of biometric sensors and devices and supplementing the automatic selection of such biometrics with user discretion adds to the flexibility and convenience of systems requiring a high level of access control. The use of a single biometric control may often fail when used outside a controlled environment and can result in routine by-passing of biometric identity verification. One of the principles herein for the use of a plurality of sensors on the wireless communication device 300 provides for a range of biometric devices suitable for different operating environments and user profiles. High value content and services are becoming more prevalent as is access to such content and services by devices that are more portable and more subject to being lost or stolen. However, the use of a single restrictive biometric may hinder access to legitimate users, often at a time when conditions are poor such as when away from an office or outdoors.

Further, access to the wireless communication device 300 may be required by someone who is not the normal user, such as an information technology worker for a corporate owner of the wireless communication device 300. It may not be possible for all IT personnel to have biometric profiles in a wireless communication device 300 so the use of a password or token as a default is an important element of a protected information system.

Various embodiments of methods, systems, and apparatus for using a plurality of biometric sensors for controlling access to a wireless communication device 300 and services provided thereby have been described. It is expected that these embodiments or others in accordance with the present invention will have application to many wireless communication devices that require a level of security for protecting services and other assets. The disclosure and claims extend to the constituent elements or equipment comprising such systems and specifically the methods employed thereby and therein. For example, one variation in the algorithms that are used to determine which of a plurality of biometric sensors may be used to gain access to the communications device or unit can be accomplished by adding a concept or element of uncertainty to the algorithm. Thus whereas the algorithm may not choose a fingerprint sensor when predetermined conditions, such as the temperature is below a certain level, this uncertainty principle can over ride the chosen sensor (for example voice prints or recognition) and require a valid fingerprint or provide conditional access but require a valid fingerprint within a time window, such as one hour or 15 minutes. In summary the predetermined conditions can include an uncertainty parameter for selecting a second biometric sensor even when all other of the plurality of predetermined conditions for a first sensor are present. In this manner a communications unit would not have any discernable pattern for gaining access or unfettered access thereby providing security for accessing the unit even when a miscreant purposely attempts to spoof the system.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication device arranged and constructed to enable a function when an identity of a user is confirmed, the wireless communication device comprising:
    a plurality of biometric devices, each of the plurality of biometric devices for assessing the identity of the user, and
    a controller, coupled to the plurality of biometric devices, for selecting one of the plurality of biometric devices when a corresponding predetermined condition is present,
    wherein the corresponding predetermined condition comprises one of a time of day, a date, an interval, and situation circumstances and wherein the situation circumstances comprise one of ambient light, temperature, and ambient noise and a corresponding biometric sensor comprises, respectively, a camera, a skin sensor, and a microphone;
    wherein the controller enables the function when the identity of the user is confirmed by the one of the plurality of biometric devices.

2. The wireless communications device of claim 1 wherein;
    the function comprises one of access to the wireless communication device, a feature, a content, an application, and a service provided by the wireless communication device.

3. The wireless communications device of claim 1 wherein the plurality of biometric devices comprises a sensor for one of fingerprint recognition, hand recognition, retinal scan, iris recognition, signature recognition, face recognition, and voice recognition.

4. A wireless communication device arranged and constructed to enable a function when an identity of a user is confirmed, the wireless communication device comprising:
    a plurality of biometric devices, each of the plurality of biometric devices for assessing the identity of the user; and
    a controller, coupled to the plurality of biometric devices, for selecting one of the plurality of biometric devices when a corresponding predetermined condition is present;
    wherein the controller enables the function when the identity of the user is confirmed by the one of the plurality of biometric devices; wherein a first biometric device has a higher reliability in assessing the identity of the user and is selected when the corresponding predetermined condition indicates a suitable operating environment.

5. The wireless communication device of claim 1 wherein the user may override the controller selection of one of the plurality of biometric devices and select a second biometric device to confirm the identity of the user.

6. A wireless communication device arranged and constructed to enable a function when an identity of a user is confirmed, the wireless communication device comprising:
    a plurality of biometric devices, each of the plurality of biometric devices for assessing the identity of the user; and a controller, coupled to the plurality of biometric devices, for selecting one of the plurality of biometric devices when a corresponding predetermined condition is present;

wherein the controller enables the function when the identity of the user is confirmed by the one of the plurality of biometric devices and wherein the controller is operable to limit a number of times a second biometric device may be used to confirm the identity of the user before a first biometric device must be used to confirm the identity of the user.

7. The wireless communication device of claim 1 where the one of the plurality of biometric devices is selected from a list that is arranged hierarchically according to a characteristic of the each of the plurality of biometric devices.

8. The wireless communication device of claim 7 wherein the characteristic for arranging the list is one of an ease of confirming the identity of the user and a reliability of confirming the identity of the user.

9. The wireless communication device of claim 1 further comprising:

a keypad for entering a password when none of the plurality of biometric sensors is selected, wherein the controller is operable to enable the function when the password matches a known password.

10. A system for authorizing the use of a feature on a wireless communication device comprising:

a plurality of biometric sensors, each for collecting a sample corresponding to a user biometric; and a controller coupled to the plurality of biometric sensors for:

collecting a first sample from one of the plurality of biometric sensors, the one of the plurality of biometric sensors selected when a corresponding predetermined condition is present; and authorizing the use of the feature when the first sample corresponds to a known sample, wherein a first biometric sensor must be used to authorize the use of the feature after a predetermined number of consecutive uses of a second biometric sensor to authorize the use of the feature.

11. The system of claim 10 wherein the one of the plurality of biometric sensors comprises a sensor for recognition of one of a fingerprint, a hand, a retina, an iris, a signature, a face, and a voice.

12. The system of claim 10 further comprising a biometric sensor selected by the controller according to the corresponding predetermined condition and an other biometric sensor selected by the user, wherein the user overrides the controller and the first sample is collected from the other sensor.

13. The system of claim 10 wherein the feature comprises one of a local function supported on the wireless communication device and a remote function accessed via a network.

14. A method for enabling a feature on a wireless communication device comprising:

collecting a biometric sample corresponding to a user from one of a plurality of biometric sensors, the one of the plurality of biometric sensors selected when a corresponding predetermined condition is present; and enabling the feature when the biometric sample corresponds to a known sample, wherein the collecting further comprises:

selecting a first biometric sensor when a predetermined condition is present, the predetermined condition indicating a suitable operating environment for the first biometric sensor, thereby resulting in more accuracy when matching the biometric sample to the known sample.

15. The method of claim 14 wherein collecting the biometric sample further comprises:

evaluating the predetermined condition corresponding to one of the plurality of biometric sensors;

selecting one of the plurality of biometric sensors when the predetermined condition exists; and collecting the biometric sample using the one of the plurality of biometric sensors.

16. The method of claim 15 wherein enabling the feature further comprises:

enabling the use of the feature using one of a password and a token when the predetermined condition is not present.

17. The method of claim 16 wherein the using the token further comprises using one of a smart card, a magnetic stripe card, a radio frequency tag and a key.

18. The method of claim 14 wherein the collecting further comprises:

selecting the one of the plurality of biometric sensors using a preferred order corresponding to one of accuracy of collecting the biometric sample and ease of collecting the biometric sample.

19. The method of claim 14 wherein the predetermined condition includes an uncertainty parameter for selecting a second biometric sensor even when all other of a plurality of predetermined conditions are present.

* * * * *